United States Patent [19]

Towler

[11] 3,854,094

[45] Dec. 10, 1974

[54] CRYSTAL CONTROLLED, FREQUENCY MODULATED TRANSMITTER

[75] Inventor: James F. Towler, Indianapolis, Ind.

[73] Assignee: Regency Electronics, Inc., Indianapolis, Ind.

[22] Filed: Nov. 1, 1972

[21] Appl. No.: 302,811

[52] U.S. Cl. .................. 325/146, 332/16 R, 332/26, 325/153

[51] Int. Cl. ............................................. H03c 3/06

[58] Field of Search ............ 332/16 R, 16 T, 26, 27, 332/28, 29 M, 30 R, 30 V, 31 T; 331/154, 161, 74, 73, 139, 155, 158, 159, 160, 162, 163, 164; 325/145, 146, 147, 148, 153, 171, 184

[56] References Cited

UNITED STATES PATENTS

| | | | |
|---|---|---|---|
| 2,104,012 | 1/1938 | Armstrong | 325/146 X |
| 2,566,826 | 9/1951 | Day | 332/16 X |
| 2,813,977 | 11/1957 | Carter | 325/146 X |
| 3,167,730 | 1/1965 | Anderson et al. | 331/161 X |
| 3,555,426 | 1/1971 | Rogers | 325/153 |
| 3,761,820 | 9/1973 | Nieson et al. | 332/16 R X |

*Primary Examiner*—Benedict V. Safourek
*Attorney, Agent, or Firm*—Woodard, Weikart, Emhardt & Naughton

[57] ABSTRACT

A frequency modulated transmitter for use at frequencies from 25 to 54 MHz is disclosed. The crystals in the transmitter oscillate at their fundamental frequency, and this frequency is divided by four to produce a lower frequency which is then modulated. This lower modulated carrier frequency is then multiplied by 24 to produce an output frequency in the desired range.

16 Claims, 8 Drawing Figures

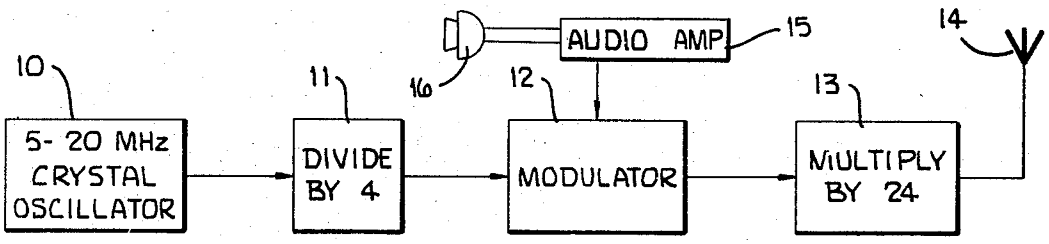
Fig. 1
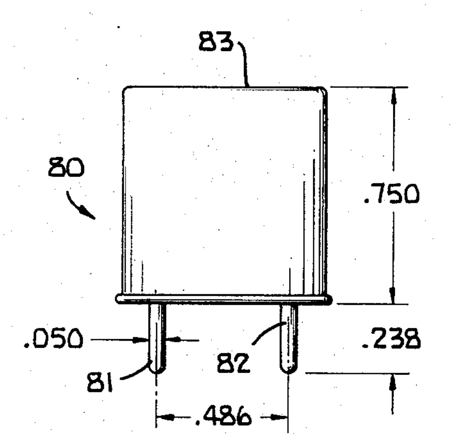
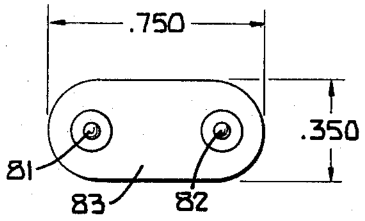
Fig. 2b
Fig. 2a
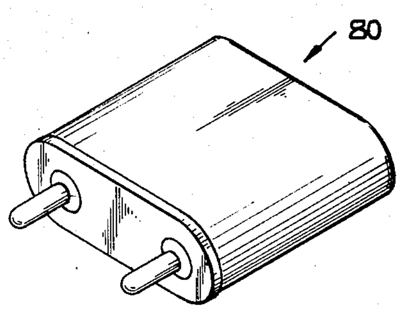
Fig. 2c
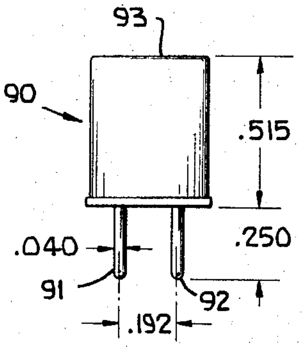
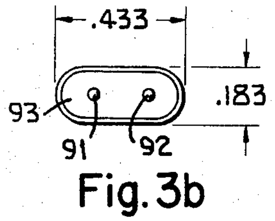
Fig. 3b
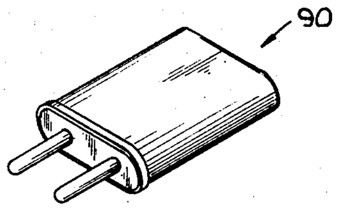
Fig. 3a
Fig. 3c

CRYSTAL CONTROLLED, FREQUENCY MODULATED TRANSMITTER

BACKGROUND OF THE INVENTION

1. Field of the Invention

The invention relates in general to a transmitter for use in a modulated carrier wave communication system. More particularly the invention relates to transmitters having a frequency or phase-modulated output signal and having a frequency multiplier to obtain the desired output frequency.

2. Description of the Prior Art

Transmitters for use at frequencies between 25 and 54 MHz usually have their frequency determined by crystals operating at their fundamental frequency at from about 0.5 to 2 MHz. The output from these crystals is then usually phase-modulated and then multiplied to obtain a frequency within the band desired. While such a transmitter produces a high quality stable signal, the use of such low frequency crystals requires either heaters to maintain the temperature of the crystals at a constant value or special temperature compensating circuits designed individually for each crystal in order to maintain the federally required frequency stability.

Certain transmitters have been designed to avoid this temperature stability problem by using higher frequency crystals which are more stable and by directly modulating the frequency of the crystal oscillator to produce the frequency modulated signal. While such circuits avoid the problem of instability due to temperature, the modulating circuits tend to introduce an element of instability in the frequency and the quality of modulation is generally not as high as with phase modulation. Furthermore, with either of these two types of transmitters, especially the later, it is often the case that the power output of the transmitter will be dependent upon the activity of the particular crystal used as a source of frequency.

The following patents are typical of related prior art transmitters: U.S. Pat. Nos. 3,110,863 to Weidknecht; 2,081,577 to Crosby; 2,682,639 to Haner; 2,691,095 to Bailey; 2,813,977 to Carter; 2,303,444 to Evans; 3,588,747 to Rusho; 2,036,164 to Usselman; 2,238,249 to Crosby.

In the patent to Carter, U.S. Pat. No. 2,813,977, a crystal oscillator is divided in frequency and then mixed with another divided oscillator frequency. The resultant frequency is then mixed with a third oscillator frequency and this resultant frequency is then multiplied to produce the frequency desired at the output. In this patent, modulation occurs at the frequency of the crystal oscillator before frequency division takes place.

SUMMARY OF THE INVENTION

The invention relates to a frequency modulated transmitter which has a crystal oscillator in which the crystals have a fundamental frequency of oscillation between 5 and 20 MHz. In the transmitter of the invention, the oscillator output is divided to produce a lower frequency signal which is then frequency or phase modulated. This modulated carrier is then multiplied in frequency to produce a final frequency at the output frequency desired for the transmitter.

The invention has many advantages over the prior art. The use of high frequency crystals inherently provides improved frequency stability over a given temperature range. In addition, the higher frequency crystals are smaller in size and less expensive than the larger crystals typically used in the prior art. The smaller size of the crystals enables packaging in miniature crystal cans, which greatly reduces the size of transmitters requiring a large number of crystals. The use of digital frequency dividing circuits provides a uniform signal level to the modulator regardless of the activity of the crystal being used. The uniform level makes the power output constant and permits a high quality of modulation.

In view of the frequency division by the digital circuits, high quality phase modulation can be used rather than the less stable modulation directly upon the crystal, which otherwise would have to be used with crystals having high fundamental frequencies. With the use of the higher frequency crystals, neither ovens nor special temperature compensating circuits are needed.

BRIEF DESCRIPTION OF THE DRAWINGS

FIG. 1 is a block diagram of an embodiment of the invention.

Figure 4:
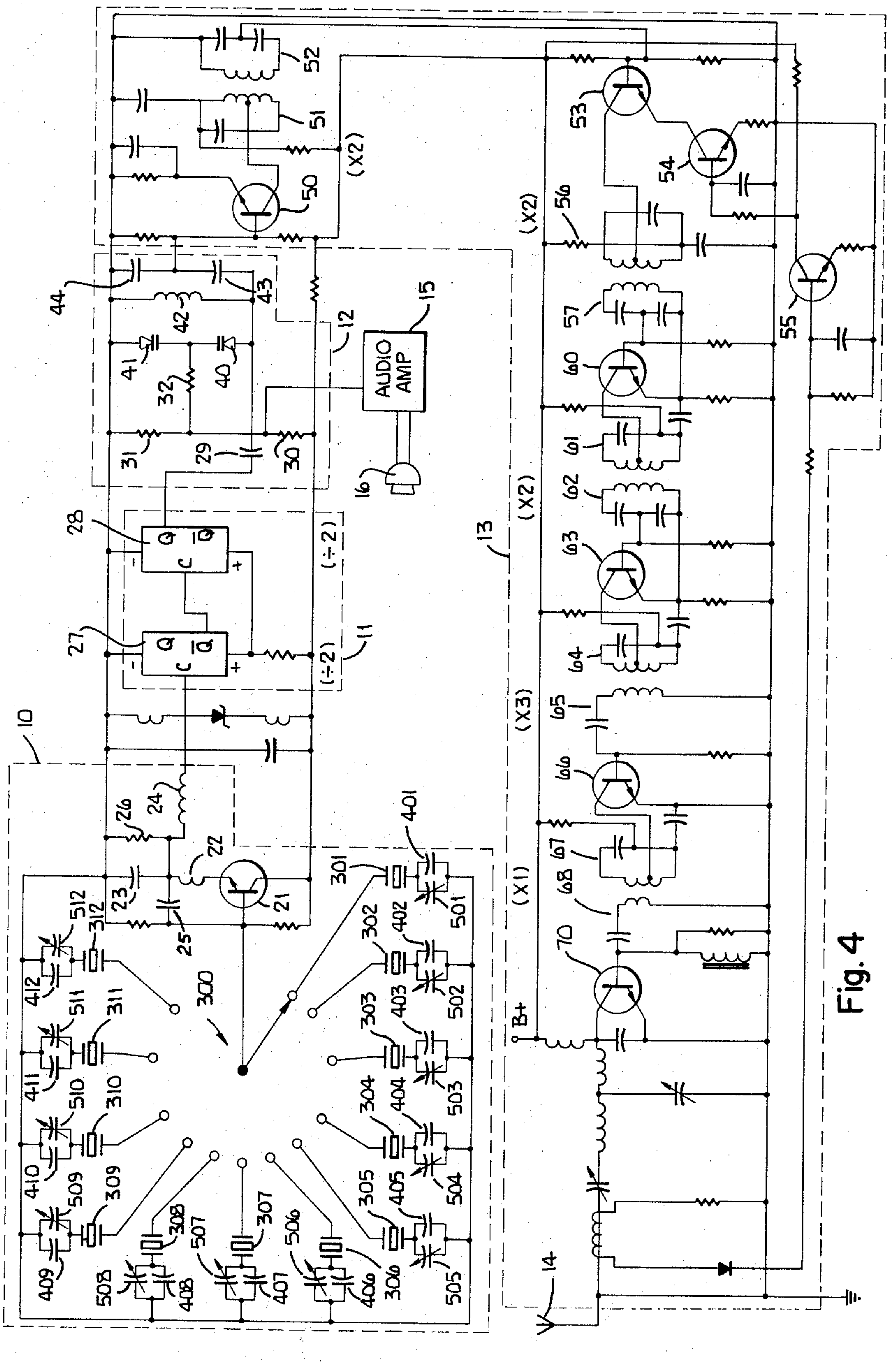

FIGS. *2a*, *2b* and *2c* illustrate a front view, bottom view, and an isometric view of a typical crystal can for a low frequency crystal.

FIGS. *3a*, *3b* and *3c* illustrate a front view, bottom view and isometric view respectively of a standard miniature crystal can. Such miniature cans are appropriate for use with the transmitter of the invention.

FIG. 4 illustrates the circuit diagram of the block diagram illustrated in FIG. 1.

DESCRIPTION OF THE PREFERRED EMBODIMENT

Referring in particular to the drawings there is illustrated in FIG. 1 a block diagram of an embodiment of the invention. A 5 to 20 MHz crystal oscillator 10 connects to a divide-by-four circuit 11. The crystals in the crystal oscillator 10 operate at their fundamental frequency, which preferably is between 8 and 16 MHz.

A microphone 16 provides an audio signal which is amplified by audio amplifier 15, and the output of the audio amplifier 15 is used to modulate the output of the divide-by-four circuit 11 in a modulator 12. The output of the modulator 12 is then multiplied by 24 by a multiply-by-24 circuit 13 to produce a modulated carrier of the desired frequency at the antenna 14.

FIGS. *2a*, *2b*, and *2c* illustrate a typical crystal can 80 such as would be used in prior art transmitters. Due to the fact that low frequency crystals are of such a large size, they require relatively large cans. Crystal can 80 includes connecting pins 81 and 82 for insertion into standard sockets for making electrical connection to the crystal inside the can. The crystal can 80 also includes an upper case 83 which encloses the crystal in metal. In comparison, FIGS. *3a*, *3b* and *3c* illustrate a miniature can 90 which is appropriate for use with the transmitter of this invention due to the relatively high crystal frequencies used. The miniature can includes connecting pins 91 and 92 as well as an upper case 93 which encloses the crystal in metal. The dimensions of the upper case 93 are 0.515 by 0.433 by 0.183 inches. The large crystal case 83 is approximately 5 times the volume of the miniature crystal case 93, thus the size reduction through the use of the miniature can can be significant especially when a large number of crystals are necessary for the transmitter. Dimensions in FIGS. 2 and 3 are in inches.

Referring in particular to FIG. 4 there are illustrated in the crystal oscillator 10, twelve crystals 301–312. A twelve position switch 300 can be used for selecting any one of the crystals 301–312 for use in determining the output frequency of the transmitter. Each of the crystals 301–312 has associated with it a fixed capacitor 401–412 and a variable capacitor 501–512. These fixed capacitors provide for proper operation of the crystal, with the variable capacitor being used to adjust the frequency of the crystal to the exact frequency desired.

The crystal selected by switch 300 is caused to oscillate at its fundamental frequency by a transistor circuit which includes a transistor 21 and a ferrite bead 22 and capacitors 23 and 25. The output signal from the oscillator circuit is coupled through inductor 24 to the divide-by-four circuit 11.

The divide-by-four circuit 11 includes a flip-flop circuit 27 having a clock input C and two outputs Q and $\overline{Q}$. This circuit functions to divide the signal from the oscillator by two. Another identical flip-flop circuit 28 connects to the output of flip-flop circuit 27 to again divide by two. Thus the output of flip-flop 28 is one-fourth the frequency of the output of oscillator 10. The flip-flop circuit preferred for use in this invention is Motorola's MC 7473 P. While the particular division in the preferred embodiment is by four, division by any integer greater than 1 is considered to be within the scope of the invention.

The signal from the microphone 16 is amplified by the audio amplifier 15, of conventional design, and is then used to modulate the output signal from the divide-by-four circuit 11. This modulation is accomplished through the action of variable capacitance diodes 40 and 41, properly biased by resistors 30, 31 and 32 and placed across a broadly tuned resonant circuit including inductors 42 and capacitors 43 and 44. The term frequency modulation as used herein is intended to include phase modulation.

A capacitor 29 is used to couple the signal from the divide-by-four circuit. The output of the modulator circuit 12 connects to conventional frequency multiplying stages where it is amplified and multiplied in frequency by a factor of 24. While 24 is the preferred factor, any integer greater than 3 is possible with this invention, it is preferred that a factor of from 10 to 30 be used. Resonant circuits 51 and 52 are tuned to twice the frequency at the base of transistor 50, thereby effectively doubling the signal from the modulator. This doubled signal is then doubled again after being amplified by transistor 53 by the resonant circuits 56 and 57 which are tuned to twice the frequency at the base of transistor 53. Transistor 54 and transistor 55 are a part of an overload protection circuit which disables the transmitter when high standing wave ratios are present at the output.

Transistor 60 and its output circuits 61 and resonant circuit 62 serve to again double the frequency. Transistor 63 and its output circuit 64 together with a coupled inductance 65 serve to triple the frequency present at the base of transistor 63. The final amplifying stages, including transistors 66 and 70 and the resonant circuit 67 and inductor 68, serve merely to amplify the signal to provide sufficient power output at the antenna 14.

While there have been described above the principles of this invention in connection with specific apparatus, it is to be clearly understood that this description is made only by way of example and not as a limitation to the scope of the invention.

What is claimed is:

1. A frequency modulated transmitter which comprises:

a. oscillator means which includes:
   1. a plurality of crystals having a fundamental frequency of oscillation between 5 to 20 MHz,
   2. switch means for selecting any one of said crystals for use in controlling the output frequency of the transmitter, and 3. means for causing said selected crystal to oscillate and for producing a first carrier at the fundamental frequency of the crystal;

b. frequency dividing means to divide said first carrier by an integer greater than 1 to produce a second carrier;

c. means for converting audible sounds into an electrical audio signal;

d. modulation means for frequency modulating said second carrier in response to said audio signal whereby a first modulated carrier is produced; and e. frequency multiplying means for multiplying said first modulated carrier by an integer greater than 3 whereby a second modulated carrier is produced for the output of the transmitter.

2. The transmitter of claim 1 in which said frequency dividing means divides by an integer greater than 3.

3. The transmitter of claim 2 in which said frequency dividing means divided by four.

4. The transmitter of claim 1 in which said frequency dividing means includes a digital counting circuit to divide said first carrier.

5. The transmitter of claim 4 in which said digital counting circuit includes two flip-flop circuits.

6. The transmitter of claim 1 in which said frequency multiplying means multiples by an integer greater than 7.

7. The transmitter of claim 6 in which said frequency multiplying means multiplies by 24.

8. The transmitter of claim 1 in which said frequency multiplying means multiplies by an integer having a value which causes said second modulated carrier to be at a frequency from 25 to 54 MHz.

9. The transmitter of claim 1 in which said plurality of crystals have fundamental frequencies between 8 and 16 MHz.

10. A compact multi-frequency, frequency modulated transmitter for use at frequencies from 25 to 54 MHz which comprises:

a. oscillator means which includes:
   1. a plurality of crystals in miniature cans, said cans having dimensions, excluding connecting leads or pins, of about 0.515 by 0.433 by 0.183 inches, or less,
   2. switch means for selecting any one of said crystals for use in controlling the output frequency of the transmitter, and
   3. means for causing said selected crystal to oscillate and for producing a first carrier at the fundamental frequency of the crystal;

b. frequency dividing means to divide said first carrier by an integer greater than 1 to produce a second carrier;
c. means for converting audible sounds into an electrical audio signal;
d. modulation means for frequency modulating said second carrier in response to said audio signal whereby a first modulated carrier is produced; and
e. frequency multiplying means for multiplying said first modulated carrier by an integer having a value which produces a second modulated carrier at a frequency from 25 to 54 MHz.

11. The transmitter of claim 10 in which said frequency dividing means includes a digital counting circuit to divide said first carrier.

12. The transmitter of claim 11 in which said digital counting circuit includes two flip-flop circuits.

13. A frequency modulated transmitter which comprises:

a. oscillator means which includes:
   1. a crystal having a fundamental frequency of oscillation between 5 and 20 MHz and
   2. means for causing said crystal to oscillate and for producing a first carrier at the fundamental frequency of the crystal;

b. frequency dividing means to divide said first carrier by an integer greater than 1 to produce a second carrier;
c. means for converting audible sounds into an electrical audio signal;
d. modulation means for frequency modulating said second carrier in response to said audio signal whereby a first modulated carrier is produced;
e. frequency multiplying means for multiplying said first modulated carrier by an integer greater than 3 whereby a second modulated carrier is produced; and
f. an antenna connected to the output of said frequency multiplying means for radiating said second modulated carrier.

14. The transmitter of claim 13 in which said frequency dividing means includes a digital counting circuit to divide said first carrier.

15. The transmitter of claim 14 in which said digital counting circuit includes two flip-flop circuits.

16. The transmitter of claim 13 in which the crystal is between 8 and 16 MHz.

* * * * *